United States Patent
Hudson et al.

(10) Patent No.: US 10,344,612 B2
(45) Date of Patent: Jul. 9, 2019

(54) COMPACT ADVANCED PASSIVE TIP CLEARANCE CONTROL

(71) Applicant: UNITED TECHNOLOGIES CORPORATION, Farmington, CT (US)

(72) Inventors: Eric A. Hudson, Harwinton, CT (US); Michael G. McCaffrey, Windsor, CT (US); Stanley J. Funk, Southington, CT (US); Scott D. Virkler, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 311 days.

(21) Appl. No.: 15/405,778

(22) Filed: Jan. 13, 2017

(65) Prior Publication Data

US 2018/0202306 A1    Jul. 19, 2018

(51) Int. Cl.
*F01D 11/18* (2006.01)
*F01D 11/02* (2006.01)
(Continued)

(52) U.S. Cl.
CPC .............. *F01D 11/18* (2013.01); *F01D 5/20* (2013.01); *F01D 11/025* (2013.01);
(Continued)

(58) Field of Classification Search
CPC .......... F01D 11/18; F01D 11/025; F01D 5/20; F01D 25/246; F04D 29/083;
(Continued)

(56) References Cited

U.S. PATENT DOCUMENTS 5,639,210 A * 6/1997 Carpenter ............... F01D 11/18
415/135
8,790,067 B2   7/2014 McCaffrey et al.
(Continued)

FOREIGN PATENT DOCUMENTS

EP          2518274       10/2012
WO        2014186015      11/2014

OTHER PUBLICATIONS

European Patent Office, European Search Report dated Jun. 21, 2018 in Application No. 17202846.6-1006.

*Primary Examiner* — Mahmoud Gimie
(74) *Attorney, Agent, or Firm* — Snell & Wilmer, L.L.P.

(57) ABSTRACT

A section of a gas turbine engine includes a rotor blade designed to rotate about an axis. The section also includes a case positioned radially outward from the rotor blade and extending circumferentially about the axis. The section also includes a control ring being annular, positioned radially inward from the case and designed to move radially relative to the case. The section also includes a segmented blade outer air seal (BOAS) including a plurality of BOAS segments each being positioned radially outward from the rotor blade, movably coupled to the control ring, and designed to move circumferentially relative to each other such that a circumferential gap between each of the plurality of BOAS segments changes in size in response to a temperature change in the section of the gas turbine engine.

20 Claims, 5 Drawing Sheets

(51) Int. Cl.
   *F01D 5/20* (2006.01)
   *F01D 25/24* (2006.01)
   *F02C 3/04* (2006.01)
   *F04D 29/32* (2006.01)
   *F04D 29/52* (2006.01)
   *F04D 29/08* (2006.01)
   *F04D 29/64* (2006.01)

(52) U.S. Cl.
   CPC .............. *F01D 25/246* (2013.01); *F02C 3/04* (2013.01); *F04D 29/083* (2013.01); *F04D 29/324* (2013.01); *F04D 29/526* (2013.01); *F04D 29/642* (2013.01); F05D 2220/32 (2013.01); F05D 2240/11 (2013.01); F05D 2240/307 (2013.01); F05D 2240/55 (2013.01); F05D 2300/171 (2013.01); F05D 2300/177 (2013.01)

(58) Field of Classification Search
   CPC .... F04D 29/324; F04D 29/526; F04D 29/642; F02C 3/04; F05D 2220/32; F05D 2240/11; F05D 2240/307; F05D 2240/55; F05D 2300/171; F05D 2300/177
   USPC ...................................................... 415/173.3
   See application file for complete search history.

(56) References Cited

U.S. PATENT DOCUMENTS

| | | |
|---|---|---|
| 2004/0071548 A1 | 4/2004 | Wilson |
| 2005/0031446 A1 | 2/2005 | Ress, Jr. |
| 2011/0189009 A1 | 8/2011 | Shapiro et al. |

\* cited by examiner

COMPACT ADVANCED PASSIVE TIP CLEARANCE CONTROL

FIELD

The present disclosure is directed to a system for adjusting tip clearance in a turbine or compressor section of a gas turbine engine and, in particular, a system for utilizing thermal changes in the turbine or compressor section to adjust the tip clearance.

BACKGROUND

Gas turbine engines include a compressor section for compressing air, a combustor section for combusting a mixture of the compressed air and fuel and outputting exhaust, and a turbine section to convert the exhaust into torque. The turbine section includes a plurality of rotor blades each connected to a rotor and designed to rotate about an axis of the gas turbine engine. The turbine section further includes a case positioned radially outward from the rotor blades and rotors. A blade outer air seal (BOAS) is positioned radially between the case and the rotor blades and is designed to form a seal between the case and the rotor blades. It is desirable for a clearance between the BOAS and the rotor blades to be relatively small during operation of the gas turbine engine. This may be challenging where tip clearance distances change in response to changing engine operating conditions due to vibration, thermal expansion, and the like.

SUMMARY

Disclosed herein is a section of a gas turbine engine. The section includes a rotor blade designed to rotate about an axis. The section also includes a case positioned radially outward from the rotor blade and extending circumferentially about the axis. The section also includes a control ring being annular, positioned radially inward from the case, and designed to move radially relative to the case. The section also includes a segmented blade outer air seal (BOAS) including a plurality of BOAS segments each being positioned radially outward from the rotor blade, movably coupled to the control ring, and designed to move circumferentially relative to each other such that a circumferential gap between each of the plurality of BOAS segments changes in size in response to a temperature change in the section of the gas turbine engine.

Any of the foregoing embodiments may also include a spring positioned radially between the segmented BOAS and the control ring and designed to exert a radially inward force on the segmented BOAS towards the rotor blade.

Any of the foregoing embodiments may also include a circumferential locking tab coupled to the case, slidably coupled to the segmented BOAS, and designed to resist circumferential movement of the segmented BOAS relative to the case.

In any of the foregoing embodiments, the case further includes a spline extending radially inward and the control ring further includes a spline socket designed to receive the spline such that the spline and the spline socket resist axial and circumferential movement of the control ring relative to the case and allow radial movement of the control ring relative to the case.

In any of the foregoing embodiments, the control ring further includes a pin extending radially outward and the case further includes a pin socket configured to receive the pin such that the pin and the pin socket resist axial and circumferential movement of the control ring relative to the case and allow radial movement of the control ring relative to the case.

Any of the foregoing embodiments may also include at least one flexible arm coupled to the case and the control ring and designed to allow radial movement of the control ring relative to the case.

In any of the foregoing embodiments, the control ring includes a first foot extending axially forward and a second foot extending axially afterward, and the segmented BOAS includes a first hook extending axially forward and radially outward relative to the first foot and a second hook extending axially aft and radially outward relative to the second foot such that a radial control gap exists between the first foot and the first hook and the segmented BOAS can move radially relative to the control ring by an amount equal to the radial control gap.

In any of the foregoing embodiments, the control ring includes at least one of a nickel-based alloy or an iron-based alloy.

Also described is a section of a gas turbine engine. The section includes a rotor blade designed to rotate about an axis. The section also includes a case positioned radially outward from the rotor blade and extending circumferentially about the axis. The section also includes a segmented blade outer air seal (BOAS) including a plurality of BOAS segments each being positioned radially outward from the rotor blade, movably coupled to the case, and designed to move circumferentially relative to each other such that a circumferential gap between each of the plurality of BOAS segments changes in size in response to a temperature change in the section of the gas turbine engine.

Any of the foregoing embodiments may also include a spring positioned radially between the segmented BOAS and the case and designed to exert a radially inward force on the segmented BOAS towards the rotor blade.

In any of the foregoing embodiments, the case includes a first foot extending axially forward and a second foot extending axially afterward, and the segmented BOAS includes a first hook extending axially forward and radially outward relative to the first foot and a second hook extending axially aft and radially outward relative to the second foot such that a radial control gap exists between the first foot and the first hook and the segmented BOAS can move radially relative to the case by an amount equal to the radial control gap.

In any of the foregoing embodiments, the first foot and the first hook resist afterward axial movement of the segmented BOAS relative to the case, and the second foot and the second hook resist forward axial movement of the segmented BOAS relative to the case.

Also described is a gas turbine engine. The gas turbine engine includes a compressor section designed to compress air. The gas turbine engine also includes a combustor section designed to receive compressed air from the compressor section, to combust a mixture of the compressed air and fuel, and to output exhaust. The gas turbine engine also includes a turbine section designed to convert the exhaust into torque to power the compressor section. At least one of the compressor section or the turbine section includes a rotor blade designed to rotate about an axis. The at least one of the compressor section or the turbine section also includes a case positioned radially outward from the rotor blade and extending circumferentially about the axis. The at least one of the compressor section or the turbine section also includes a control ring being annular, positioned radially inward from the case, movably coupled to the case, and designed to move radially relative to the case. The at least one of the compressor section or the turbine section also includes a segmented blade outer air seal (BOAS) including a plurality of BOAS segments each being positioned radially outward from the rotor blade, movably coupled to the control ring, and designed to move circumferentially relative to each other such that a circumferential gap between each of the plurality of BOAS segments changes in size in response to a temperature change in the turbine section of the gas turbine engine.

In any of the foregoing embodiments, the at least one of the compressor section or the turbine section further includes a spring positioned radially between the segmented BOAS and the control ring and designed to exert a radially inward force on the segmented BOAS towards the rotor blade.

In any of the foregoing embodiments, the at least one of the compressor section or the turbine section further includes a circumferential locking tab coupled to the case, slidably coupled to the segmented BOAS, and designed to resist circumferential movement of the segmented BOAS relative to the case.

In any of the foregoing embodiments, the case further includes a spline extending radially inward and the control ring further includes a spline socket designed to receive the spline such that the spline and the spline socket resist axial and circumferential movement of the control ring relative to the case and allow radial movement of the control ring relative to the case.

In any of the foregoing embodiments, the control ring further includes a pin extending radially outward and the case further includes a pin socket designed to receive the pin such that the pin and the pin socket resist axial and circumferential movement of the control ring relative to the case and allow radial movement of the control ring relative to the case.

In any of the foregoing embodiments, the at least one of the compressor section or the turbine section further includes at least one flexible arm coupled to the case and the control ring and is designed to allow radial movement of the control ring relative to the case.

In any of the foregoing embodiments, the control ring includes a first foot extending axially forward and a second foot extending axially afterward, and the segmented BOAS includes a first hook extending axially forward and radially outward relative to the first foot and a second hook extending axially aft and radially outward relative to the second foot such that a radial control gap exists between the first foot and the first hook and the control ring can move radially relative to the control ring by an amount equal to the radial control gap.

In any of the foregoing embodiments, the first foot and the first hook resist afterward axial movement of the segmented BOAS relative to the control ring, and the second foot and the second hook resist forward axial movement of the segmented BOAS relative to the control ring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
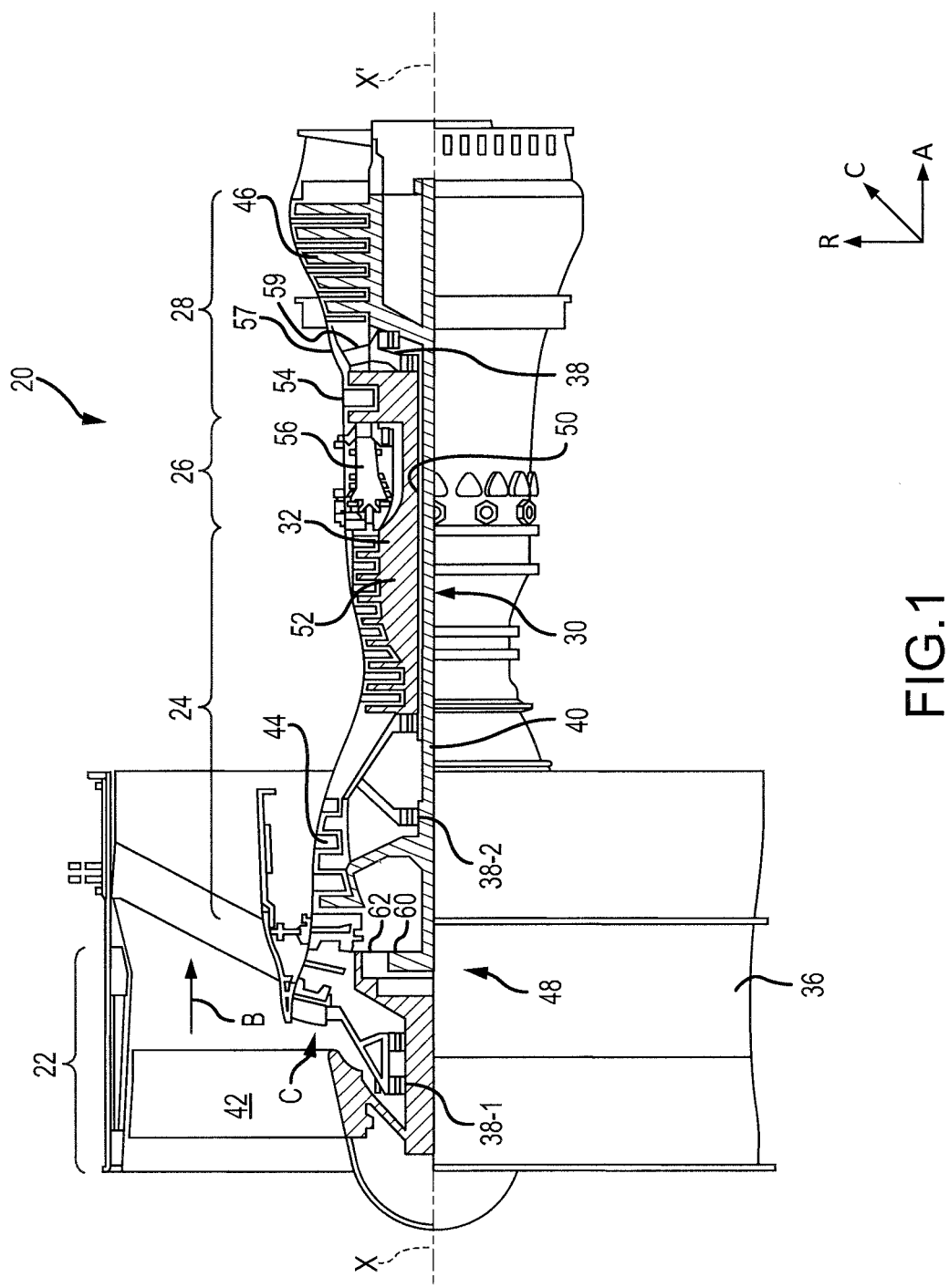
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft architectures.

The gas turbine engine 20 may generally comprise a low speed spool 30 and a high speed spool 32 mounted for rotation about an engine central longitudinal axis X-X' relative to an engine static structure 36 or engine case via several bearing systems 38, 38-1, and 38-2. An A-R-C axis is shown throughout the drawings to illustrate the axial, radial, and circumferential directions relative to the central longitudinal axis X-X'. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be compressed by the low pressure compressor 44 then the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Figure 2:
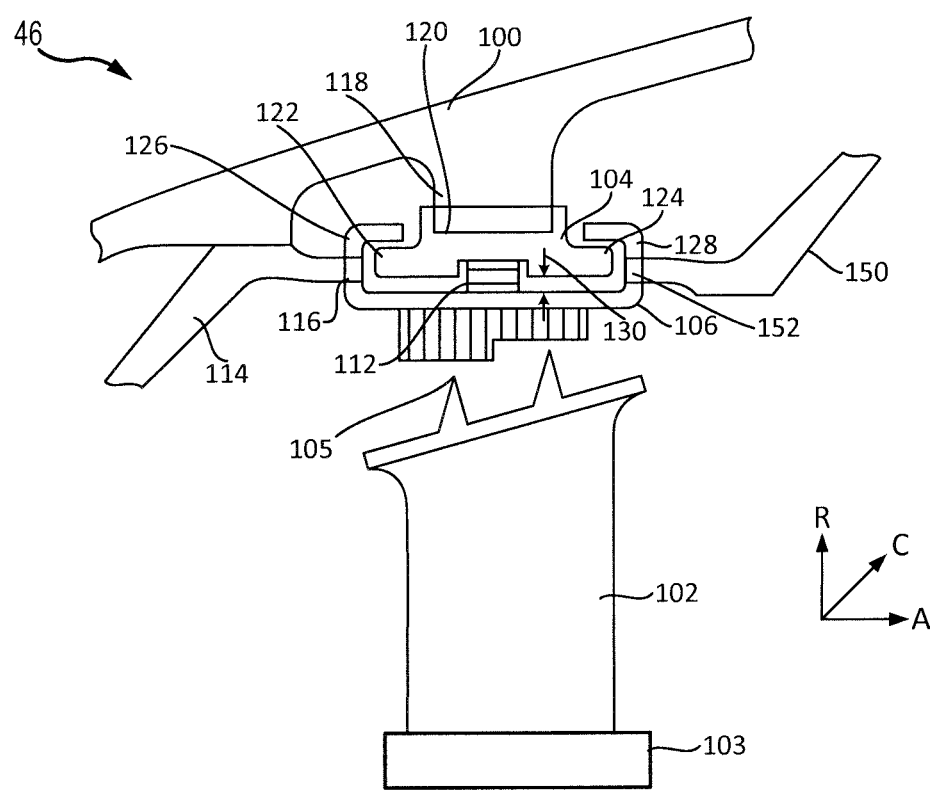
FIG. 2 is a cross-sectional view of a portion of a low pressure turbine section of the gas turbine engine of FIG. 1, in accordance with various embodiments.

Turning to FIG. 2, an enlarged view of a portion of the low pressure turbine section 46 is shown. Although the disclosure is directed to the low pressure turbine section 46, one skilled in the art will realize that the concepts disclosed herein are usable in any turbine section or compressor section of the gas turbine engine 20 of FIG. 1 or another gas turbine engine, such as a gas turbine engine for use with supersonic aircraft, turboprop aircraft, marine propulsion systems, helicopters, or the like.

The low pressure turbine section 46 includes a case 100 and a plurality of rotor blades including a rotor blade 102. Referring to FIGS. 1 and 2, the rotor blade 102 receives exhaust from the compressor section 26 and rotates in response to receiving the exhaust, thus converting the exhaust into torque. The torque is then transferred to the compressor section 24 to drive the compressor section 24. The rotor blade 102 rotates about the axis X-X' in response to receiving the exhaust.

A segmented blade outer air seal (BOAS) 106 is positioned radially between the rotor blade 102 and the case 100. The segmented BOAS 106 is designed to form a seal with an outer diameter edge 105 of the rotor blade 102.

The rotor blade 102 is coupled to a rotor 103. During operation of the gas turbine engine 20, all components of the low pressure turbine section 46 are heated to a relatively high temperature. In that regard and in a conventional gas turbine engine, a case, a BOAS, a rotor blade, and a rotor 103 expand in response to being subjected to such relatively high temperatures. In response to the gas turbine engine reducing power, the ambient temperatures reduce, causing the components to reduce in size. In particular, the case and the BOAS reduce in size in a shorter amount of time than the rotors. In response to re-acceleration of the gas turbine engine, forces received by the rotor blade cause the rotor blade to expand relatively quickly, and the rotor may still be expanded due to previous exposure to relatively high temperatures. The case and the BOAS, however, take more time to re-expand relative to the rotor blade. In that regard, it is desirable for the clearance between the rotor blade and the BOAS to be sufficiently large that a rub event does not occur in such a re-acceleration. Thus, during normal operation of the gas turbine engine, performance of the conventional low pressure turbine section is undesirably reduced due to the increased clearance between the rotor blade and the BOAS.

Returning reference to FIG. 2, the low pressure turbine section 46 includes features that provide for an adaptive tip clearance between the rotor blade 102 and the segmented BOAS 106. In particular, the low pressure turbine section 46 includes a control ring 104. The control ring 104 is an annular structure and is positioned radially inward from the case 100.

A first circumferential locking tab 114 may be coupled to the case 100 or another component, such as a downstream rotor or stator. The first circumferential locking tab 114 may be slidably coupled to the segmented BOAS 106 such that the segmented BOAS 106 may move radially relative to the case 100. For example, the first circumferential locking tab 114 may define an annular volume 116 for receiving a portion of the segmented BOAS 106. The first circumferential locking tab 114 may resist at least one of circumferential or axial movement of the segmented BOAS 106 relative to the case 100.

A second circumferential locking tab 150 may also be coupled to the case 100 or another component. The second circumferential locking tab 150 may be slidably coupled to the segmented BOAS 106 such that the segmented BOAS 106 may move radially relative to the case 100. For example, the second circumferential locking tab 150 may define an annular volume 152 for receiving a portion of the segmented BOAS 106. The second circumferential locking tab 150 may resist at least one of circumferential or axial movement of the segmented BOAS 106 relative to the case 100.

The case 100 may include a spline 118 extending radially inward. The control ring 104 may define a spline socket 120 configured to receive the spline 118. The spline 118 and the spline socket 120 may be positioned to allow radial movement of the control ring 104 relative to the case 100 and to resist at least one of axial or circumferential movement of the control ring 104 relative to the case.

The control ring 104 may include a first foot 122 and a second foot 124 positioned axially aft of the first foot 122. The segmented BOAS 106 may include a first hook 126 and a second hook 128 positioned axially aft of the first hook 126. The first hook 126 may extend axially forward and radially outward from the first foot 122.

The first hook 126 may resist forward movement of the control ring 104 relative to the segmented BOAS 106. Stated differently, the first hook 126 may resist afterward movement of the segmented BOAS 106 relative to the control ring 104. In various embodiments, the control ring 104 may be restricted from moving axially relative to the case 100 via the first circumferential locking tab 114 and/or the second circumferential locking tab 150. In that regard, the first hook 126 may resist afterward movement of the segmented BOAS 106 relative to the case 100. The second hook 128 may extend axially aft and radially outward from the second foot 124. In that regard, the second hook 128 may resist afterward movement of the control ring 104 relative to the segmented BOAS 106. Stated differently, the second hook 128 may resist forward movement of the segmented BOAS 106 relative to the control ring 104 and/or relative to the case 100.

In response to the gas turbine engine 20 of FIG. 1 being turned off for a period of time, a radial control gap 130 may exist radially between the segmented BOAS 106 and the control ring 104. The interface between the feet 122, 124 and the hooks 126, 128 limit a size of the radial control gap 130.

A spring 112 may be positioned radially between the control ring 104 and the segmented BOAS 106. The spring 112 may exert a radially inward force on the segmented BOAS 106. Thus, the spring 112 resists radial movement of the segmented BOAS 106 relative to the control ring 104 in response to the radial control gap 130 being present. The spring 112 may include a compression spring, a torsion spring, a conical spring, or the like.

Figure 3A:
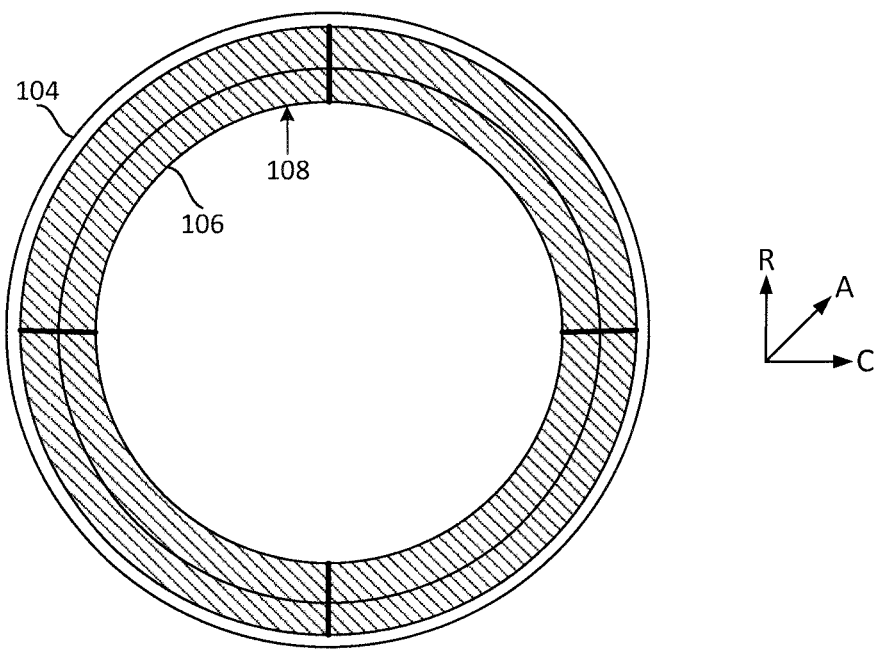
FIG. 3A is an axial view of the portion of the low pressure turbine section of FIG. 2 subjected to relatively high temperatures, in accordance with various embodiments.

Referring to FIGS. 1, 2, and 3A, in response to the gas turbine engine 20 being operational for a period of time, all elements of the low pressure turbine section 46 may be expanded due to the relatively high temperatures. In that regard, the segmented BOAS 106 may include a plurality of BOAS segments 108 that may be in contact with one another due to the expansion of the segmented BOAS 106. Such expansion reduces the radial control gap 130 between the segmented BOAS 106 and the control ring 104. Furthermore, expansion of the control ring 104 further reduces the radial control gap 130.

Figure 3B:
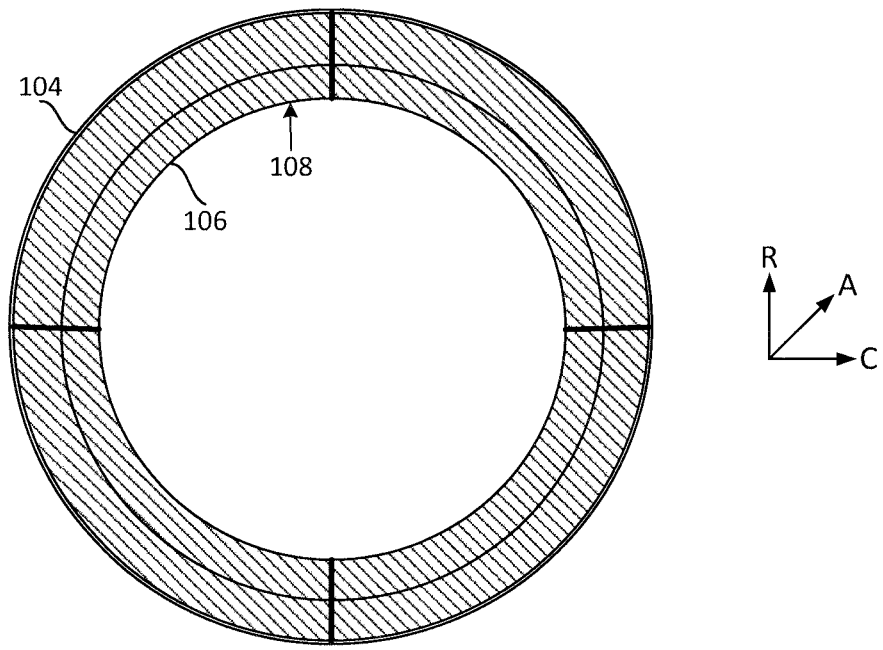
FIG. 3B is an axial view of the portion of the low pressure turbine section of FIG. 2 subjected to relatively high temperatures, in accordance with various embodiments.

Referring to FIGS. 1, 2, and 3B, the segmented BOAS 106 and/or the control ring 104 may continue to grow after the plurality of BOAS segments 108 are in contact. In response to such increased growth, the segmented BOAS 106 may expand radially outward, as shown in FIG. 3B. In such a situation, the spring 112 may be fully compressed such that the segmented BOAS 106 is in direct contact with the control ring 104 and the case 100 may resist further expansion of the control ring 104 such that the case 100 and/or the control ring 104 resists any additional radially outward expansion of the segmented BOAS 106.

Figure 4:
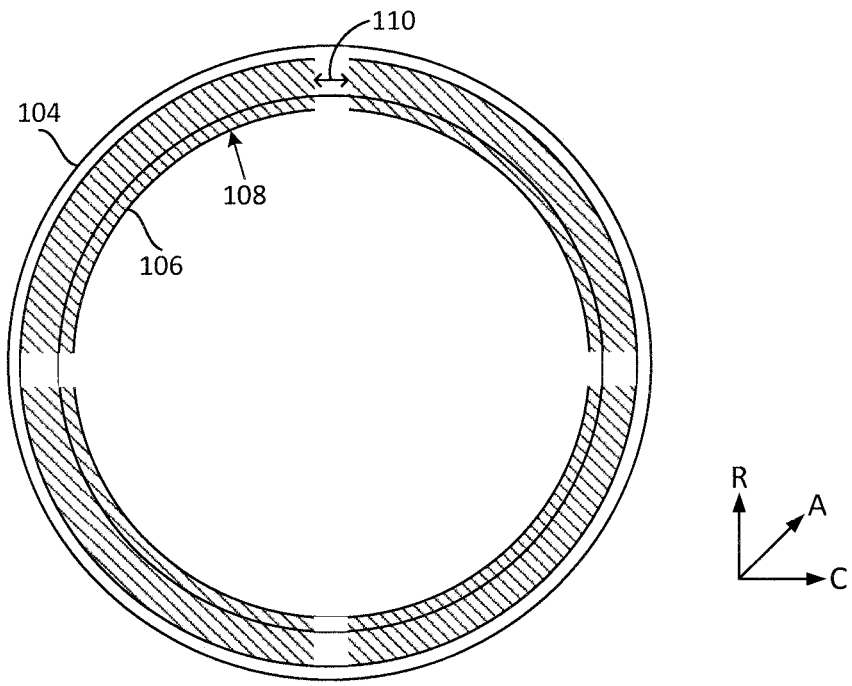
FIG. 4 is an axial view of the portion of the low pressure turbine section of FIG. 2 subjected to relatively low temperatures, in accordance with various embodiments.

In response to the gas turbine engine 20 turning off and referring to FIGS. 1, 2, and 4, the case 100 and segmented BOAS 106 may reduce in size relatively quickly while the rotor 103 and the control ring 104 reduce in size relatively slowly. In response, a circumferential gap 110 may be present between each of the plurality of BOAS segments 108.

In response to re-acceleration of the gas turbine engine 20, the slow reduction in size of the control ring 104 allows the clearance between the rotor blade 102 and the segmented BOAS 106 to remain relatively constant. As the rotor blade 102 expands, the segmented BOAS 106 expands at a similar rate.

Returning reference to FIG. 2, it is desirable for the segmented BOAS 106 to expand at a similar rate as the rotor blade 102 in response to increased temperatures (for example, the segmented BOAS may have a theiinal coefficient of expansion that is similar to a thermal coefficient of expansion of the rotor blade 102 and/or thicknesses of materials may be selected to provide such expansion rate matching). The segmented BOAS 106 and the rotor blade 102 may include the same material or different materials. For example, one or both of the segmented BOAS 106 and the rotor blade 102 may include a metal such as a nickel-based alloy.

Likewise, it is desirable for the control ring 104 to expand at a similar rate as the rotor 103 in response to increased temperatures (for example, the control ring 104 may have a thermal coefficient of expansion that is similar to a thermal coefficient of expansion of the rotor 103 and/or thicknesses of materials may be selected to provide such expansion rate matching). The control ring 104 and the rotor 103 may include the same material or different materials. For example, one or both of the control ring 104 and the rotor 103 may include a metal such as a nickel-based alloy, and iron alloy, or the like. Where used in this context, a nickel-based alloy includes more nickel by weight percent (wt %) than any other single element and, where used in this context, and iron-based alloy includes more iron by wt % than any other single element. For example, a compound having 40% nickel, 30% cobalt and 30% aluminum may be referred to as a nickel-based alloy.

Figure 5:
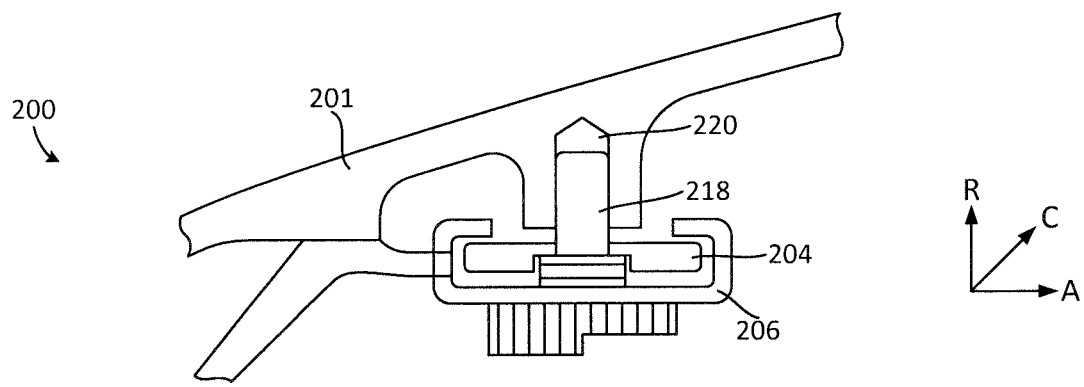
FIG. 5 is a cross-sectional view of a portion of a compressor section or a turbine section of a gas turbine engine, in accordance with various embodiments.

Turning now to FIG. 5, a section 200 of a gas turbine engine is shown. The section may include a turbine section or a compressor section. The section 200 includes a case 201, a control ring 204, and a segmented BOAS 206. The section 200 may be similar to the low pressure turbine section 46 of FIG. 2. However, instead of a spline and a spline socket, the case 201 may define a pin socket 220 and the control ring 204 may include a pin 218. The pin 218 may be received by the pin socket 220. The pin 218 and the pin socket 220 may resist axial and/or circumferential movement of the control ring 204 relative to the case 201, and may facilitate radial movement of the control ring 204 relative to the case 201 in a similar manner as the spline 118 and spline socket 120 of FIG. 2. The pin 218 may be coupled to the control ring 204 in a variety of manners such as a tack weld, a secondary pin, or the like.

Figure 6:
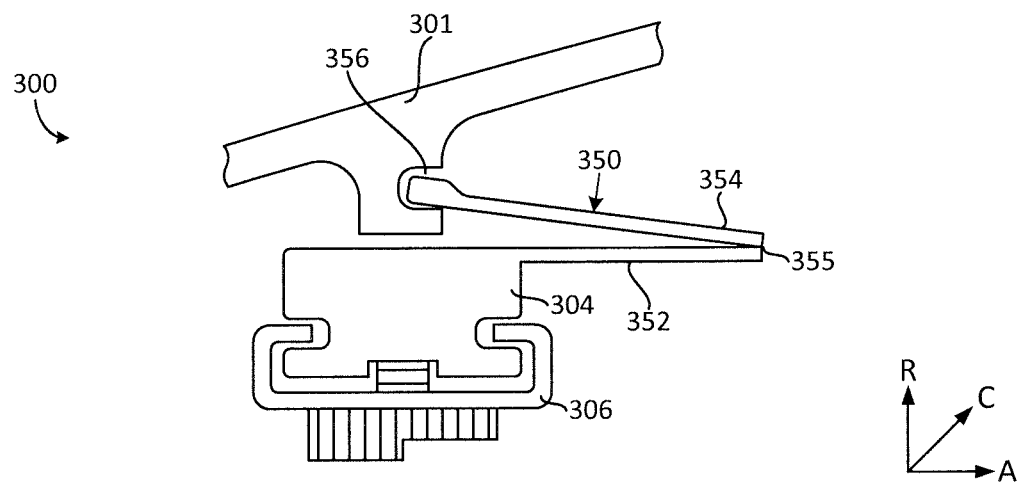
FIG. 6 is a cross-sectional view of a portion of a compressor section or a turbine section of a gas turbine engine, in accordance with various embodiments.

Referring now to FIG. 6, another section 300 of a gas turbine engine may include a case 301, a control ring 304, and a segmented BOAS 306. The section 300 may also include at least one flexible arm 350 coupled to the case 301 and the control ring 304. The at least one flexible arm 350 may facilitate radial movement of the control ring 304 relative to the case 301 and may resist axial and/or circumferential movement of the control ring 304 relative to the case 301. In particular, the at least one flexible arm 350 includes a first arm 352 coupled to the control ring 304 and a second arm 354 coupled to the first arm 352. A joint 355 is present between the first arm 352 and the second arm 354 and allows the first arm 352 to move relative to the second arm 354. As shown, the joint 355 includes the first arm 352 welded to the second arm 354 at an angle. In various embodiments, the joint 355 may be formed by bending a single arm. The second arm 354 is coupled to a pocket 356 of the case 301.

Figure 7:
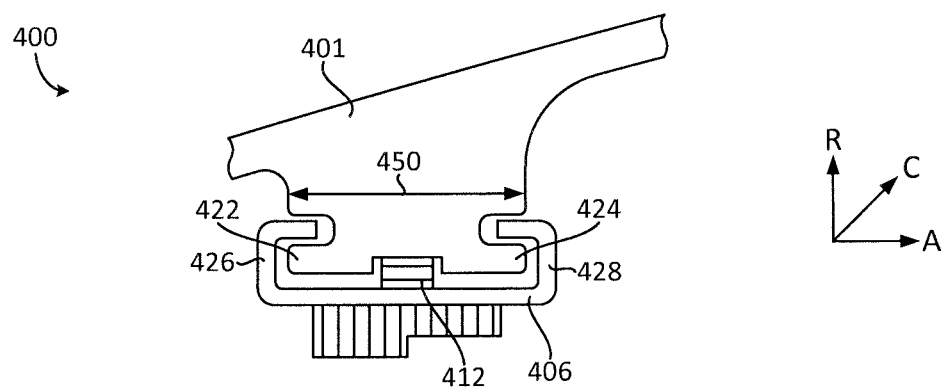
FIG. 7 is a cross-sectional view of a portion of a compressor section or a turbine section of a gas turbine engine, in accordance with various embodiments.

Turning now to FIG. 7, another section 400 of a gas turbine engine is shown. The section 400 includes a case 401 and a segmented BOAS 406. Instead of a control ring positioned radially between the case 401 and the segmented BOAS 406, the segmented BOAS 406 is removably coupled to the case 401. In that regard, the case 401 includes a first foot 422 and a second foot 424.

The segmented BOAS 406 includes a first hook 426 and a second hook 428. The first hook 426 extends axially forward and radially outward from the first foot 422. The second hook 428 extends axially afterward and radially outward from the second foot 424. In that regard, the interaction of the hooks 426, 428 and the feet 422, 424 resist axial movement of the segmented BOAS 406 relative to the case 401 and limit radial movement of the segmented BOAS 406 relative to the case.

The section 400 further includes a spring 412 positioned radially between the segmented BOAS 406 and the case 401. The spring 412 exerts a radially inward force on the segmented BOAS 406.

The case 401 may be designed to have a relatively large distance 450 proximate to the segmented BOAS 406. In that regard, the expansion rate of the portion of the case 401 near the distance 450 may be similar to an expansion rate of a corresponding rotor.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A section of a gas turbine engine, comprising:
   a rotor blade configured to rotate about an axis;
   a case positioned radially outward from the rotor blade and extending circumferentially about the axis;
   a control ring being annular, positioned radially inward from the case, and configured to move radially relative to the case;
   a segmented blade outer air seal (BOAS) including a plurality of BOAS segments each being positioned radially outward from the rotor blade, movably coupled to the control ring, and configured to move circumferentially relative to each other such that a circumferential gap between each of the plurality of BOAS segments changes in size in response to a temperature change in the section of the gas turbine engine; and
   a circumferential locking tab coupled to the case, slidably coupled to the segmented BOAS, and configured to resist circumferential movement of the segmented BOAS relative to the case.

2. The section of claim 1, further comprising a spring positioned radially between the segmented BOAS and the control ring and configured to exert a radially inward force on the segmented BOAS towards the rotor blade.

3. The section of claim 1, wherein the circumferential locking tab defines an annular volume for receiving a portion of the segmented BOAS.

4. The section of claim 1, wherein the case further includes a spline extending radially inward and the control ring further includes a spline socket configured to receive the spline such that the spline and the spline socket resist axial and circumferential movement of the control ring relative to the case and allow radial movement of the control ring relative to the case.

5. The section of claim 1, wherein the control ring further includes a pin extending radially outward and the case further includes a pin socket configured to receive the pin such that the pin and the pin socket resist axial and circumferential movement of the control ring relative to the case and allow radial movement of the control ring relative to the case.

6. The section of claim 1, further comprising at least one flexible arm coupled to the case and the control ring and configured to allow radial movement of the control ring relative to the case.

7. The section of claim 1, wherein the control ring includes a first foot extending axially forward and a second foot extending axially aftward, and the segmented BOAS includes a first hook extending axially forward and radially outward relative to the first foot and a second hook extending axially aft and radially outward relative to the second foot such that a radial control gap exists between the first foot and the first hook and the segmented BOAS can move radially relative to the control ring by an amount equal to the radial control gap.

8. The section of claim 1, wherein the control ring includes at least one of a nickel-based alloy or an iron-based alloy.

9. A section of a gas turbine engine, comprising:
   a rotor blade configured to rotate about an axis;
   a case positioned radially outward from the rotor blade and extending circumferentially about the axis;
   a segmented blade outer air seal (BOAS) including a plurality of BOAS segments each being positioned radially outward from the rotor blade, movably coupled to the case, and configured to move circumferentially relative to each other such that a circumferential gap between each of the plurality of BOAS segments changes in size in response to a temperature change in the section of the gas turbine engine; and
   a circumferential locking tab coupled to the case, slidably coupled to the segmented BOAS, and configured to resist circumferential movement of the segmented BOAS relative to the case.

10. The section of claim 9, further comprising a spring positioned radially between the segmented BOAS and the case and configured to exert a radially inward force on the segmented BOAS towards the rotor blade.

11. The section of claim 9, wherein the case includes a first foot extending axially forward and a second foot extending axially aftward, and the segmented BOAS includes a first hook extending axially forward and radially outward relative to the first foot and a second hook extending axially aft and radially outward relative to the second foot such that a radial control gap exists between the first foot and the first hook and the segmented BOAS can move radially relative to the case by an amount equal to the radial control gap.

12. The section of claim 11, wherein the first foot and the first hook resist aftward axial movement of the segmented BOAS relative to the case, and the second foot and the second hook resist forward axial movement of the segmented BOAS relative to the case.

13. A gas turbine engine, comprising:
   a compressor section configured to compress air;
   a combustor section configured to receive compressed air from the compressor section, to combust a mixture of the compressed air and fuel, and to output exhaust; and
   a turbine section configured to convert the exhaust into torque to power the compressor section,
   wherein at least one of the compressor section or the turbine section include:
      a rotor blade configured to rotate about an axis,
      a case positioned radially outward from the rotor blade and extending circumferentially about the axis,
      a control ring being annular, positioned radially inward from the case, movably coupled to the case, and configured to move radially relative to the case,
      a segmented blade outer air seal (BOAS) including a plurality of BOAS segments each being positioned radially outward from the rotor blade, movably coupled to the control ring, and configured to move circumferentially relative to each other such that a circumferential gap between each of the plurality of BOAS segments changes in size in response to a temperature change in the turbine section of the gas turbine engine, and
      a circumferential locking tab coupled to the case, slidably coupled to the segmented BOAS, and configured to resist circumferential movement of the segmented BOAS relative to the case.

14. The gas turbine engine of claim 13, wherein the at least one of the compressor section or the turbine section further includes a spring positioned radially between the segmented BOAS and the control ring and configured to exert a radially inward force on the segmented BOAS towards the rotor blade.

15. The gas turbine engine of claim 13, wherein the circumferential locking tab defines an annular volume for receiving a portion of the segmented BOAS.

16. The gas turbine engine of claim 13, wherein the case further includes a spline extending radially inward and the control ring further includes a spline socket configured to receive the spline such that the spline and the spline socket resist axial and circumferential movement of the control ring relative to the case and allow radial movement of the control ring relative to the case.

17. The gas turbine engine of claim 13, wherein the control ring further includes a pin extending radially outward and the case further includes a pin socket configured to receive the pin such that the pin and the pin socket resist axial and circumferential movement of the control ring relative to the case and allow radial movement of the control ring relative to the case.

18. The gas turbine engine of claim 13, wherein the at least one of the compressor section or the turbine section further includes at least one flexible arm coupled to the case and the control ring and configured to allow radial movement of the control ring relative to the case.

19. The gas turbine engine of claim 13, wherein the control ring includes a first foot extending axially forward and a second foot extending axially aftward, and the segmented BOAS includes a first hook extending axially forward and radially outward relative to the first foot and a second hook extending axially aft and radially outward relative to the second foot such that a radial control gap exists between the first foot and the first hook and the control ring can move radially relative to the control ring by an amount equal to the radial control gap.

20. The gas turbine engine of claim 19, wherein the first foot and the first hook resist aftward axial movement of the segmented BOAS relative to the control ring, and the second foot and the second hook resist forward axial movement of the segmented BOAS relative to the control ring.

* * * * *